(12) United States Patent
Kiss et al.

(10) Patent No.: US 10,263,984 B2
(45) Date of Patent: Apr. 16, 2019

(54) AUTHENTICATION FAILURE HANDLING FOR ACCESS TO SERVICES THROUGH UNTRUSTED WIRELESS NETWORKS

(71) Applicant: Apple Inc., Cupertino, CA (US)

(72) Inventors: Krisztian Kiss, Hayward, CA (US); Thomas F. Pauly, Cupertino, CA (US); Ajoy K. Singh, Milpitas, CA (US); Rohan C. Malthankar, San Jose, CA (US); Vikram Bhaskara Yerrabommanahalli, Sunnyvale, CA (US); Rafael L. Rivera-Barreto, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 128 days.

(21) Appl. No.: 15/273,165

(22) Filed: Sep. 22, 2016

(65) Prior Publication Data

US 2017/0094512 A1 Mar. 30, 2017

Related U.S. Application Data

(60) Provisional application No. 62/235,439, filed on Sep. 30, 2015.

(51) Int. Cl.
*H04L 29/06* (2006.01)
*H04W 12/06* (2009.01)
(Continued)

(52) U.S. Cl.
CPC ...... *H04L 63/0884* (2013.01); *H04L 63/0853* (2013.01); *H04W 12/06* (2013.01);
(Continued)

(58) Field of Classification Search
CPC .................................................. H04L 63/0884
See application file for complete search history.

(56) References Cited

U.S. PATENT DOCUMENTS 9,319,959 B2* 4/2016 White .................. H04W 36/30
9,380,610 B2* 6/2016 Yerrabommanahalli ...................
H04W 4/90
(Continued)

FOREIGN PATENT DOCUMENTS

EP 2209330 A2 7/2010
EP 2887594 A1 6/2015

OTHER PUBLICATIONS

Ahmed et. al.; Inter-system mobility in evolved packet system (EPS): Connecting non-3GPP accesses; Published in: 2010 14th International Conference on Intelligence in Next Generation Networks; Date of Conference: Oct. 11-14, 2010; IEEE Xplore (Year: 2010).*

(Continued)

*Primary Examiner* — Bradley Holder
(74) *Attorney, Agent, or Firm* — Dickinson Wright RLLP

(57) ABSTRACT

Apparatus and methods to support authentication failure handling by network elements and by a wireless communication device when attempting access to services through non-cellular wireless networks by the wireless communication device are disclosed. Error messages received from evolved packet core (EPC) network elements, such as an authentication, authorization, and accounting (AAA) server, are mapped to failure messages provided to wireless communication devices by internetworking equipment, such as an evolved packet data gateway (ePDG). The wireless communication device determines a failures cause based on the failure messages and disallows retry attempts until select criteria are satisfied.

20 Claims, 7 Drawing Sheets

(51) Int. Cl.
  *H04W 76/18* (2018.01)
  *H04W 8/18* (2009.01)
  *H04W 84/02* (2009.01)
  *H04W 88/06* (2009.01)
  *H04W 4/12* (2009.01)
  *H04W 4/16* (2009.01)
  *H04W 84/12* (2009.01)

(52) U.S. Cl.
  CPC .............. *H04W 76/18* (2018.02); *H04W 4/12* (2013.01); *H04W 4/16* (2013.01); *H04W 8/183* (2013.01); *H04W 84/02* (2013.01); *H04W 84/12* (2013.01); *H04W 88/06* (2013.01)

(56) References Cited

U.S. PATENT DOCUMENTS

| | | | |
|---|---|---|---|
| 9,438,566 B2 | 9/2016 | Zhang et al. | |
| 9,867,098 B2* | 1/2018 | Kwok | H04L 65/1069 |
| 2004/0105434 A1* | 6/2004 | Baw | H04W 84/12 |
| | | | 370/355 |
| 2005/0059391 A1* | 3/2005 | Ikeda | H04W 88/02 |
| | | | 455/426.2 |
| 2005/0075109 A1* | 4/2005 | Neyret | H04M 3/42246 |
| | | | 455/445 |
| 2008/0176582 A1 | 7/2008 | Ghai et al. | |
| 2010/0199332 A1* | 8/2010 | Bachmann | H04L 63/0428 |
| | | | 726/4 |
| 2011/0171926 A1 | 7/2011 | Faccin et al. | |
| 2011/0171940 A1* | 7/2011 | Dinur | H04W 48/18 |
| | | | 455/414.1 |
| 2013/0065585 A1 | 3/2013 | Pelletier et al. | |
| 2013/0155948 A1 | 6/2013 | Pinheiro et al. | |
| 2014/0071970 A1 | 3/2014 | Velasco | |
| 2014/0101726 A1* | 4/2014 | Gupta | H04N 21/2365 |
| | | | 726/4 |
| 2015/0350983 A1* | 12/2015 | Kwok | H04L 65/1069 |
| | | | 370/331 |
| 2016/0029189 A1* | 1/2016 | Michael | H04W 4/16 |
| | | | 455/417 |
| 2016/0044064 A1* | 2/2016 | Pison | H04W 4/10 |
| | | | 370/312 |
| 2016/0163463 A1 | 6/2016 | Namikawa et al. | |
| 2016/0183085 A1* | 6/2016 | Yerrabommanahalli | |
| | | | H04W 12/04 |
| | | | 713/153 |

OTHER PUBLICATIONS

Rodriguez et. al.; A 3GPP system architecture evolution virtualized experimentation infrastructure for mobility prototyping; Published in: Proceeding TridentCom '08 Proceedings of the 4th International Conference on Testbeds and research infrastructures; Austria—Mar. 2008; ACM Digital Library (Year: 2008).*
European Patent Application 16189983.6—Extended European Search Report dated Feb. 10, 2017.
3GPP TS 24302 V13.3.0; "3rd Generation Partnership Project; 1-8, Technical Specification Group Core Network 10-15 and Terminals; Access to the 3GPP Evolved Packet Core (EPC) via non-3GPP access networks; Stage 3 (Release 13)", Sep. 25, 2015, 120 pages.
European Patent Application 16189983.6—Office Action dated Aug. 14, 2018.

* cited by examiner

AUTHENTICATION FAILURE HANDLING FOR ACCESS TO SERVICES THROUGH UNTRUSTED WIRELESS NETWORKS

CROSS REFERENCE TO RELATED APPLICATIONS

This application claims the benefit of U.S. Provisional Patent Application No. 62/235,439, entitled "AUTHENTICATION FAILURE HANDLING FOR ACCESS TO SERVICES THROUGH UNTRUSTED WIRELESS NETWORKS", filed Sep. 30, 2015, and incorporated by reference herein in its entirety for all purposes This application is related to U.S. Provisional Patent Application No. 62/094,758, entitled "METHODS AND APPARATUS TO SUPPORT LOCATION SPECIFIC CONTROL OF ACCESS TO SERVICES THROUGH UNTRUSTED WIRELESS NETWORKS", filed Dec. 19, 2014, and incorporated by reference herein in its entirety for all purposes.

FIELD

The described embodiments generally relate to wireless communications, including methods and apparatus to support authentication failure handling when disallowing access to services and/or to connection establishment with network gateways through untrusted wireless networks by a wireless communication device.

BACKGROUND

Fourth generation (4G) cellular wireless networks employing newer radio access technology that implements one or more $3^{rd}$ Generation Partnership Project (3GPP) Long Term Evolution (LTE) and LTE Advanced (LTE-A) standards are rapidly being developed and deployed by network operators worldwide. The newer cellular wireless networks provide a range of packet based services in parallel with legacy second generation (2G) and third generation (3G) wireless networks that can provide both circuit-switched voice services and packet-switched data services. The cellular wireless networks also overlap with multiple wireless local area network (WLAN) based networks that may provide additional localized high-speed packet data access for various services. Wireless communication devices can include capabilities to connect with different types of wireless networks, e.g., based on what wireless networks are available at a particular location, based on various capabilities of available wireless networks, based on capabilities of the wireless communication device, based on properties of particular services provided by one or more of the wireless networks, and/or based on service subscriptions with which the wireless communication device and/or the user thereof is associated. Wireless communication devices can include wireless radio circuitry that provides for communication via multiple radio frequency interfaces that can connect through different wireless networks individually and/or in parallel. Wireless cellular network service providers are adding WLAN connectivity to provide access to cellular services through WLAN networks for cellular service subscribers to supplement access via cellular wireless access networks. In some circumstances, access to particular "cellular" services by a subscriber using a wireless communication device may vary based on whether the wireless communication device is connected through an access network portion of a cellular wireless network, through a trusted non-cellular wireless network, or through an untrusted non-cellular wireless network. Each WLAN can provide a different level or different type of security than provided by a cellular wireless network. In addition, for regulatory or business reasons, a wireless service provider may seek to allow or deny access to one or more particular cellular services based on one or more factors including a location of a wireless communication device, a type of wireless network through which a connection is realized, or a type of connection that is capable of being established. When services and/or connections are disallowed by network elements of the evolved packet core (EPC) of the cellular wireless network, interconnecting network elements, such as an evolved packet data gateway (ePDG) that connects to WLAN access networks communicate authentication/authorization failure messages to a wireless communication device attempting to access services and/or establish a connection. In the absence of detailed information about reasons for the failure, the wireless communication device can attempt to retry repeatedly to access services and/or establish connections thereby impacting network resources and power consumption at the wireless communication device. As such, there exists a need for solutions that provide for managing authentication failure handling by network elements and wireless communication devices when attempting to access cellular wireless network services through non-cellular wireless networks.

SUMMARY

Apparatus and methods to support authentication failure (and other service access and/or connection establishment error) handling by network elements and by a wireless communication device when attempting access to services through non-cellular wireless networks by the wireless communication device, such as user equipment (UE), are disclosed. Representative embodiments of methods and apparatuses to map error messages received from EPC network elements, such as an authentication, authorization, and accounting (AAA) server, to failure messages provided to UEs by internetworking equipment, such as ePDGs, are provided herein. Additionally, actions for the UEs to take in response to receipt of failure messages when attempting to access services and/or establish connections through non-cellular wireless networks are also provided. Solutions provided herein may be used as part of and/or in conjunction with one or more 3GPP wireless communication protocols.

In some embodiments, an ePDG interconnects a non-cellular wireless access network to a packet data network (PDN) gateway that connects with the EPC of a cellular wireless network to provide access to one or more cellular network based services for a UE via the non-cellular wireless access network. The UE attempts to establish a secure tunnel to an access point name (APN) that offers a set of services to which the UE seeks to gain access. The UE uses authentication procedures based on an Extensible Authentication Protocol (EAP) Authentication and Key Agreement (AKA) when attempting to establish connections and access services via non-cellular wireless access networks. When the authentication procedure fails, such as (1) when attempting to access via a visited public land mobile network (VPLMN) for which the UE is not allowed to roam, (2) when attempting to connect to an APN for which the UE is not allowed access, (3) when the UE and/or the user thereof, such as based on subscription services, is not recognized by the EPC, (4) when access via a particular radio access technology (RAT) type is not allowed, and/or (5) when access to particular APNs and/or services and/or via particular RATs at a particular geographic location/area is not allowed, one or more network elements, such as an AAA server for a home network and/or for a visited network, provide specific authentication failure messages to the ePDG. The ePDG maps the authentication failure messages received from the network elements to applicable error messages to send to the UE, such as Internet Key Exchange version 2 (IKEv2) messages. The UE determines retry behavior based at least in part on the error messages received. In some embodiments, the UE determines whether an APN and/or the EPC is accessible from a particular PLMN, from any PLMN, within a geographic area, via a particular RAT type (or set of RAT types), and/or any combination of these. In some embodiments, the UE attempts to retry establishing a connection and/or access a service via the same ePDG after a back-off time period up to a limited number of retries. In some embodiments, the number of retries and/or the back-off time period is based on pre-configuration of the UE and/or based on a network specified values. In some embodiments, the UE is precluded from attempting to establish a connection to a particular APN (or any APN) and/or access a particular service (or set of services) via the same ePDG, via any ePDG in the same PLMN, via any ePDG in any PLMN until one or more of the following: (1) the UE is powered off, (2) the security credentials for the UE, such as a UICC/USIM and/or eSIM/eUICC changes, (3) the UE selects a different PLMN, (4) the UE changes its geographic location by a pre-configured measure, (5) the UE changes to a different geographic tracking/location area, or (6) or a retry timer expires (when attempting to retry up to a limited number of times).

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
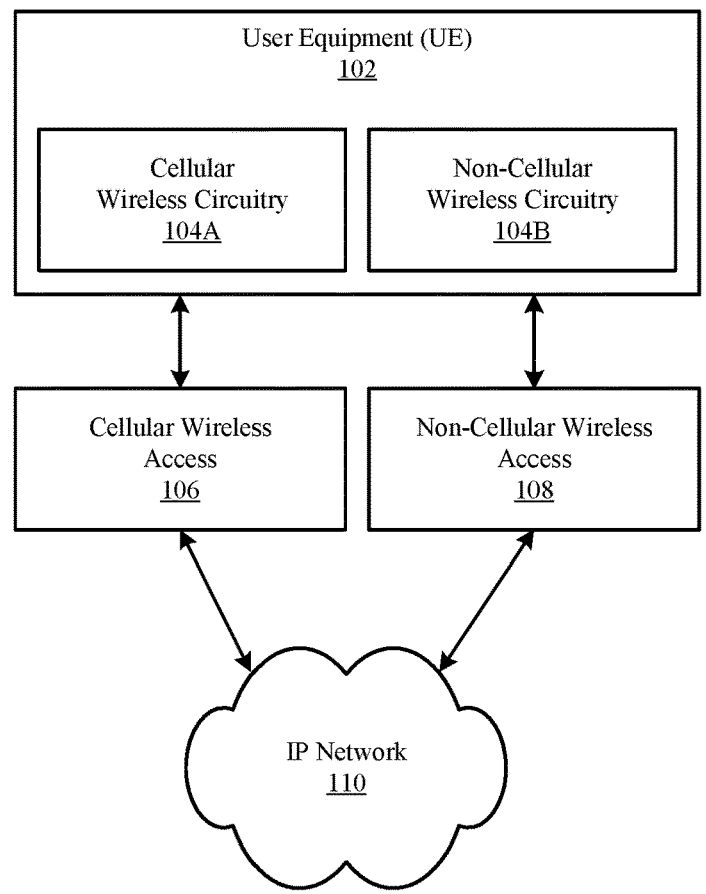
FIG. 1 illustrates an exemplary wireless communication device configurable to connect individually or in parallel through a cellular wireless access network and a non-cellular wireless access network, in accordance with some embodiments.

Representative examples for controlling access to one or more access point names (APNs) and/or services provided through the APNs for a wireless communication device based on a geographic location of the wireless communication device are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

Wireless service providers are deploying WLANs in parallel with cellular wireless networks to expand options for access to evolved packet core (EPC) services, such as Internet Protocol Multimedia Subsystem (IMS) based services including voice over IP (VOIP), and "Application" type services including visual voice mail (VVM), short message service (SMS), and multimedia message service (MMS). Access to these EPC services through a trusted WLAN can be realized using an S2a reference point interface and access through an untrusted WLAN network can be realized using an S2b reference point interface. Wireless communication devices can support packet data network (PDN) connections through multiple wireless interfaces, such as via a cellular wireless interface and via a trusted or untrusted WLAN interface, both individually and in parallel. Wireless service providers can seek to control access to services depending upon various criteria including, but not limited to, a location of the wireless communication device, whether the wireless communication device is on a "home" network or on a "roaming" network, based on the type of connection through which the wireless communication device connects including security establishment, a radio access technology (RAT) type for the access connection, a wireless communication device and/or user's subscription profile, etc. In order to ensure secure communication, connections by a wireless communication device that traverse an S2b reference point can use an Internet Key Exchange Version 2 (IKEv2) protocol between the wireless communication device and an evolved packet data gateway (ePDG). The wireless communication device can establish a secure tunnel for each access point name (APN) to which a connection is required to access services offered by the APN.

For example, an IMS tunnel can be used to provide VoIP services at one APN, while a separate "Application" tunnel can be used to provide MMS and/or other EPC based services to the wireless communication device. Parallel secure tunnels can provide access to different services, and wireless service providers can seek to control to which services a wireless communication device can have access based various criteria. Access to services can be controlled by determining whether to establish a connection with an APN and/or by determining which services are accessible through an APN.

Wireless access through untrusted WLAN connections using an S2b reference point interface via the Internet to wireless service provider based services, e.g., evolved packet core (EPC) services, can be provided to a wireless communication device when operating anywhere in the world. Based on local regulatory requirements and/or for various business reasons, a wireless service provider can seek to allow and/or disallow access to services selectively based on a location of the wireless communication device, based on an access network type through which the wireless communication device seeks to connect, based on whether the wireless communication device connects through a home network or through a visited network (e.g., when roaming), as well as based on service subscriptions associated with the wireless communication device and/or a user thereof. A wireless service provider can also allow access to one set of services, such as messaging services, for a wireless communication device, while disallowing access to another set of services, such as VoIP services, when the wireless communication device is roaming.

To establish a connection with an APN, the wireless communication device uses authentication procedures based on EAP-AKA to access via an untrusted WLAN or based on EAP-AKA' to access via a trusted WLAN without requiring input for a user of the wireless communication device. During the authentication process, a failure can occur, for different reasons, such as (1) when the wireless communication device accesses via a WLAN that is deployed by a visited PLMN (VPLMN) into which the wireless communication device does not have permission to roam, (2) when the wireless communication device attempts to connect with an APN for which the wireless communication device does not have permission, (3) when a particular service to which the wireless communication device seeks access is not part of a subscription for the wireless communication device and/or a user thereof, (4) when particular services/APNs are available for access only through certain locations and/or via certain RAT types, or (5) when the wireless communication device and/or a user thereof is not authorized to access the services of the EPC for the cellular service provider. If the wireless communication device receives a generic authentication error message while attempting to establish a connection and/or access a service, the wireless communication device can attempt multiple retries repeatedly via the same access network and/or to the same APN and/or for the same service, which can result in unnecessary network signaling. Without knowledge of a cause for the authentication failure, the wireless communication device can inadvertently waste network resources as well as drain its own battery by repeatedly attempting to access the denied service and/or to establish the failed connection.

For access via an untrusted WLAN, the EAP-AKA protocol and/or the IKEv2 protocol can be extended to support communication of error messages that correspond to different authentication failure scenarios. Representative authentication failure scenarios can include user unknown, no non-3GPP user subscription data, no APN subscription, roaming not allowed, or RAT type not allowed, such as defined in the 3GPP Technical Specification (TS) 29.273, which is incorporated by reference herein in its entirety for all purposes. Similarly, for access via a trusted WLAN, the EAP-AKA' protocol and/or the WLAN control protocol (WLCP) can be extended to include specific corresponding error messages. A network element, such as an ePDG, which bridges between the WLAN access network and the EPC of the wireless service provider, can receive authentication/authorization failure messages from one or more network elements of the EPC, such as from an AAA server associated with a home network and/or with a visited network.

The ePDG, via which the wireless communication device seeks to establish a secure tunnel, can notify the wireless communication device whether a set (or a subset) of services offered by a particular APN, access to the particular APN, access via a particular RAT type, and/or access from a specific geographic location of the wireless communication device is allowed or disallowed. In some embodiments, the wireless communication device can be disallowed from establishing and/or maintaining a connection to a particular APN and/or a particular set of services, while operating in a specific geographic location. In some embodiments, the wireless communication device can access only a subset of services available at that APN, based on a subscription service and/or based on the geographic location from which the wireless communication device is operating. In some embodiments, a network element, such as an ePDG, can notify the wireless communication device during establishment of a secure tunnel, such as an IPSec tunnel, that access to a particular APN (or set of APNs) or to a particular service (or set of services) is not allowed. In some embodiments, the notification to the wireless communication device is provided after establishment of the secure tunnel. In some embodiments, access to a subset of services of an APN is provided through the secure tunnel when the wireless communication device connects through an untrusted wireless network. In some embodiments, access to services by a wireless communication device can be based on a combination of one or more of: a type of connection, a type of wireless access network through which a connection is established or being established, a type of tunnel established or being established, a current or estimated geographic location of the wireless communication device, and a service policy associated with the wireless communication device.

When multiple services are supported over a single APN, e.g., VoIP and SMS via an IMS APN, individual services can be selectively allowed or disallowed in place of and/or in conjunction with allowing or disallowing establishment of a secure tunnel to the APN via the ePDG from a WLAN access network. In some embodiments, the ePDG allows a wireless communication device to establish a secure IKEv2 tunnel for a specific APN, and other network elements, such as a serving call session control function (S-CSCF) determines whether to accept or reject an IMS registration for different services by the wireless communication device. In some embodiments, all, some or none of the services available via the APN may be allowed and/or disallowed. In some embodiments, the wireless communication device can initiate registration of one or more services, and the S-CSCF (or another combination of applicable controlling network elements) can determine whether each of the one or more services is allowed or disallowed for the wireless communication device. The S-CSCF can first accept registration of the wireless communication device and then initiate a deregistration procedure to remove one or more disallowed services from the registration status record of the wireless communication device.

As described in further detail herein, solutions to support selective access to services for a specific APN, to which a wireless communication device seeks to connect, can be based on various criteria, such as via an access network type through which the wireless communication device attempts to establish a connection and access services and/or a location at which the wireless communication device operates. As controlled by one or more network elements, such as by an ePDG, IMS servers, and/or AAA servers, access to a wireless service provider's EPC services can be limited by selective allowance or disallowance of particular services by the IMS servers and/or by allowing or disallowing establishment of an IKEv2 tunnel with the ePDG. The ePDG can receive, in some embodiments, specific error messages from network elements, such as from AAA servers that can include information related to reasons for the disallowance of a service and/or establishment of a connection. The ePDG can map the error messages received from the network elements to parallel error messages, (which can include a one-to-one mapping or a many-to one mapping), to provide to the wireless communication device an indication of an authentication/authorization failure to access one or more services and/or to establish a connection. The wireless communication device can use the information in the error message(s) received from the ePDG to determine at least in part subsequent behavior, such as whether to retry, when to retry, how often to retry, how long to wait to retry, requirements for retry, etc. In some embodiments, the wireless communication device waits for a period of time, such as based on expiration of a back-off timer, before attempting to retry gaining access to a service and/or to establish a connection via the ePDG. In some embodiments, the wireless communication device attempts to retry up to a maximum number of times, with fixed and/or variable time between each retry. In some embodiments, the wireless communication device waits until a state of the wireless communication device changes and/or a location of the wireless communication device changes, such as when the wireless communication device is powered down and subsequently powered up, when a USIM (or an eSIM equivalent) changes, when changing PLMNs, when changing tracking/location areas (or other similar geographic areas), when moving a certain distance, when changing access RAT types, or any combination of these.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) LTE and LTE Advanced (LTE-A) or similar "later generation" cellular wireless access communication capabilities as well as wireless local area network communication capabilities. In various embodiments, these capabilities may allow a respective UE to communicate and manage simultaneous IP flows via multiple wireless access networks.

Additionally, it should be understood that the UEs described herein may be configured as multi-mode wireless communication devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, and LTE-A standards or 3GPP2's CDMA2000 (1×RTT, 2×EV-DO, HRPD, eHRPD) standards. Multi-mode UEs can also support communication using wireless local area networking protocols, e.g., IEEE 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

IKEv2 is an Internet Engineering Task Force (IETF) specified protocol described in the Request For Comments (RFC) 5996 and RFC 7296 documents, which are incorporated by reference herein in their entirety for all purposes. The IKEv2 signaling protocol can be used to establish a security association between the UE and a network element, e.g., an evolved packet data gateway (ePDG), such as when establishing an Internet Protocol Security (IPsec) Encapsulated Security Protocol (ESP) tunnel between the UE and the network element to provide for secure communication between the UE and the network, such as based on mutual authentication and cryptographic key negotiation. The IKEv2 signaling protocol can also be used to exchange additional information between the UE and the ePDG using an extensibility mechanism, e.g., using information messages and information exchange sequences as defined, at least in part, in Sections 1.4 and 1.5 of RFC 5996.

FIG. 1 illustrates a wireless system 100 that includes user equipment (UE) 102, which includes wireless circuitry that can be configured to connect the UE 102 with one or more wireless networks individually or in parallel, in accordance with some embodiments. The UE 102 includes both cellular wireless circuitry 104A, which can be configured to connect the UE 102 through a cellular wireless access 106 to various services provided via an Internet Protocol (IP) packet based network 110, and non-cellular wireless circuitry 104B, which can be configured to connect the UE 102 through a non-cellular wireless access 108 to the same IP network 110. An LTE evolved packet system (EPS) provides services to the UE 102, both "real-time" services, such as voice/video conference calls, and data communication services, such as web browsing and email access, using an IP protocol. The LTE EPS, as introduced in the Release 8 3GPP wireless communication standard, defines an architecture in which heterogeneous wireless access systems, such as a combination of cellular wireless access 106 and non-cellular wireless access 108, can be used by the UE 102 to connect to a common core network (not shown). The UE 102 can establish a packet data network (PDN) connection through one wireless access and subsequently add or change to a second wireless access. The UE 102 can communicate over multiple wireless accesses, such as the cellular wireless access 106 and the non-cellular wireless access 108, individually or simultaneously using the same PDN connection. In some circumstances, a wireless service provider can seek to allow access to particular services, such as a set of one or more EPC based services, through one type of wireless access, e.g., the cellular wireless access 106, and not through another type of wireless access, e.g., the non-cellular wireless access 108, at least based on a location of the UE 102. Thus, the UE 102 can access through an untrusted WLAN via an S2b interface IPSec tunnel one or more services based on various criteria to permit access as described herein, such as user/device subscription, location, RAT type, access network type, home vs. roaming network, service subscription, APN subscription, non-3GPP access subscription/permissions, etc.

The cellular wireless circuitry 104A and the non-cellular wireless circuitry 104B provide for wireless radio frequency (RF) connections between the UE 102 and parallel wireless networks that interconnect with the IP network 110 via the cellular wireless access 106 and the non-cellular wireless access 108 respectively. In some embodiments, the wireless circuitry 104A/B includes one or more baseband processor(s), and a set of RF analog front-end circuitry. In some embodiments, the wireless circuitry 104A/B and/or a portion thereof can include or be referred to as one or more wireless transmitter(s)/receiver(s) or transceiver(s) or radio(s). The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 104A/B can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless access networks and/or wireless access equipment included therein.

Figure 2:
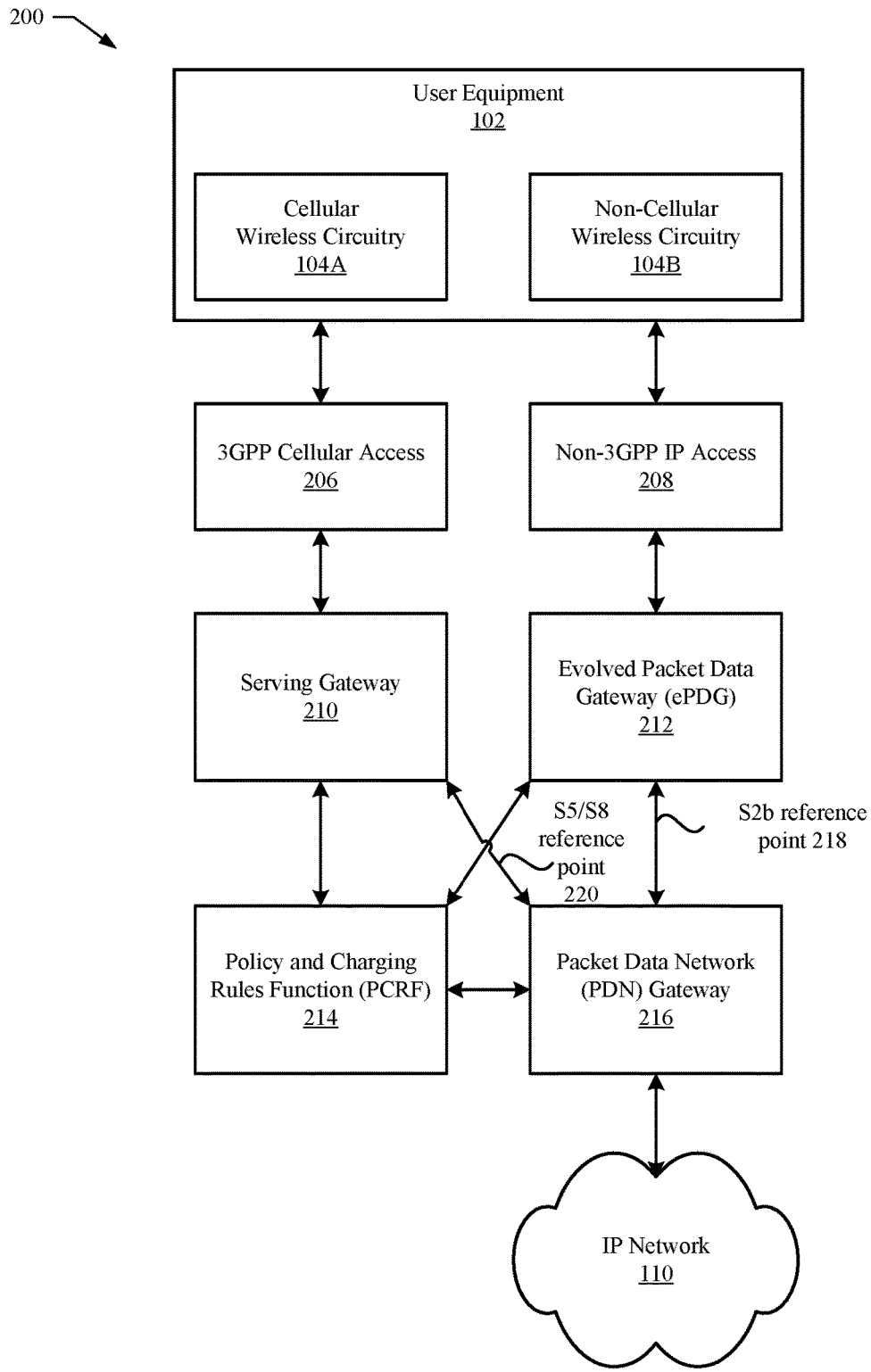
FIG. 2 illustrates example network elements of wireless access networks and a core network, in accordance with some embodiments.

FIG. 2 illustrates a wireless system 200 that includes the UE 102 communicatively coupled to the IP network 110 through a 3GPP cellular access 206 and/or through a non-3GPP IP-based wireless access 208, in accordance with some embodiments. In some embodiments, the 3GPP cellular wireless access 206 includes an evolved universal terrestrial access network (E-UTRAN) or other network elements of an LTE/LTE-A wireless network. In some embodiments, the non-3GPP IP access 208 includes a wireless local area network (WLAN) or portions thereof, e.g., a wireless access point, and thus the non-3GPP IP access 208 can also be referred to as a WLAN access. In some embodiments, the WLAN access can also be referred to as a Wi-Fi access to correspond to a WLAN that operates in accordance with an IEEE 802.11 wireless communication protocol. The UE 102 can be configured to connect individually and/or simultaneously to a given packet data network (PDN) through the 3GPP cellular wireless access 206 and the non-3GPP IP-based wireless access 208. The UE 102 can also be configured to add an IP flow to, delete an IP flow from, and/or move an IP flow between one or the other of the parallel wireless accesses, e.g., the 3GPP cellular access 206 and the non-3GPP IP-based wireless access 208, for a PDN connection. The 3GPP cellular access 206 connects to a serving gateway (GW), which connects to a PDN gateway 216 through an S5 reference point 220 or an S8 reference point 220 for roaming users. The PDN gateway 216 provides a connection to the IP network 110 through which a variety of services can be accessed. The non-3GPP IP access 208 connects to an evolved packet data gateway (ePDG) 212, which connects to the PDN gateway 216 through an S2b reference point 218. Each of the serving gateway 210, the ePDG 212, and the PDN gateway 216 are also connected to a policy and charging rules function (PCRF) 214.

The 3GPP S2b reference point 218 between the ePDG 212 and the PDN gateway 216 provides a mechanism to allow the UE 102, when attached via an untrusted non-3GPP IP access network (e.g., non-3GPP IP access 208), to connect securely via a 3GPP evolved packet system (EPS) network to the IP network 110 and to access services via the secure connection. The UE 102 can establish a secure connection, e.g., an Encapsulating Security Payload (ESP) tunnel based on an IP Security (IPsec) protocol, using an IKEv2 protocol signaling exchange between the UE 102 and the ePDG 212, which in turn can establish a secure tunnel, e.g., a Proxy Mobile IPv6 (PMIP) or GTP tunnel, to the PDN gateway 216 when a session for the UE 102 is anchored.

Support for Selective Access

In some embodiments, for the non-3GPP IP access 208, e.g., such as a WLAN access, when establishing a new connection via the S2b reference point 218, access to certain access point names (APNs) and/or certain services are allowed or disallowed based on criteria associated with the UE 102 and/or non-3GPP IP access 208. Communication of notification of allowance or disallowance of access to APNs (and/or to services provided through APNs) can be accomplished at least in part using IKEv2 message exchanges. In some embodiments, the UE 102 and the ePDG 212 can exchange information while establishing a secure tunnel between the UE 102 and the ePDG 212. In some embodiments, access to an APN can be allowed or disallowed by determining whether to establish (or complete establishment of) a secure tunnel to an APN. As each secure tunnel can be associated with a specific APN, the ePDG 212 in conjunction with information provided by the UE 102 (and/or determined for the UE 102) can allow or disallow a corresponding secure tunnel for each APN. In some embodiments, particular APNs can be allowed when accessed through an S2b interface from some geographic locations and not through other geographic locations. In addition, the UE 102, in some embodiments, can access an APN while at a geographic location through a 3GPP cellular access 206 while in a particular location but not through a non-3GPP IP access 208 while operating in the same particular location. In some embodiments, network elements of an EPC associated with the APNs to which the UE 102 seeks to establish a connection and/or access a service can deny access by providing particular Diameter messages that indicate authentication/authorization failures. Representative diameter messages can include user unknown, roaming not allowed, and RAT type not allowed. The ePDG 212 can map Diameter messages to IKEv2 messages to provide to the UE 102 when authentication/authorization failures occur. The IKEv2 messages can include information about the authentication/authorization failure to permit the UE 102 to determine next steps in response, e.g., whether, when, in what manner, and/or under what conditions to retry access to the APN(s) and/or services.

The UE 102 and the ePDG 212 can be considered as IKEv2 peers that exchange information during the establishment of a secure tunnel, e.g., during an authorization and authentication procedure, as part of a "configuration payload exchange" and/or through one or more "notify messages" using one or more IKEv2 attributes. In some embodiments, the IKEv2 attributes used can be formatted in accordance with attribute formats as defined in the IETF RFC 5996 and/or IETF RFC 7296, e.g., as shown in one or more of Sections 1.4, 1.5, and 3.15. IKEv2 attributes that can be used for communication between the UE 102 and the ePDG 212 as described herein, and may be defined in one or more 3GPP specifications and/or registered for use with the Internet Assigned Numbers Authority (IANA). Error messages as described herein for the IKEv2 protocol can be added to those defined for use and stored by the IANA.

Selective allowance and/or disallowance of the establishment and/or maintenance of secure tunnels to particular APNs, and/or access to particular services offered by particular APNs, such as 3GPP EPC based services, when the UE 102 connects via an untrusted WLAN (e.g., Wi-Fi) network through an S2b interface can be based on various criteria such as user subscription, device subscription, access network type, roaming properties, geographic location, etc. Network elements, including but not limited to the ePDG 212 and AAA servers associated with an EPC, can determine connectivity, e.g., whether to establish and/or maintain a secure tunnel to an APN, and/or control access to a set of services, e.g., whether to permit registration for one or more services provided via the APN. As wireless service providers add WLAN access networks to supplement and/or offload cellular access networks, the wireless service provide can seek to offer access to core network services, such as IMS, VVM, MMS, SMS, etc. As different APNs can be used for different services, the wireless service provider can seek to control access to a particular APN and/or to particular services provided by an APN to the UE 102 based on various criteria, such as its geographic location and/or based on the type of wireless connection through which the UE 102 seeks to access the services. For example, the wireless service provider can seek to allow access to SMS/MMS while disallowing VoIP services when the UE 102 operates in a particular geographic location and connects through an untrusted non-3GPP IP access 208. In the same geographic location, the wireless service provider can allow access to certain services when the UE 102 connects through the 3GPP cellular access 206 and disallow access to the same services when the UE 102 connects through the non-3GPP IP access 208.

In some embodiments, the ePDG 212 can provide a notification message to the UE 102 during and/or after establishing the secure tunnel to indicate whether access to a service (or set of services) provided by an APN and/or establishment of a connection to an APN is allowed or disallowed. In some embodiments, the notification message can indicate that access to a particular APN is not allowed for one or more reasons, such as not available at the current geographic location of the UE 102, not available due to lack of recognition of the user and/or the UE 102, restricted based on subscription of the user and/or the UE 102, restricted due to roaming (vs home network access), or restricted based on RAT type for the access network through which the UE 102 attempts to communicate. In some embodiments, the notification message can indicate that a particular service is not allowed. In some embodiments, the notification message can indicate that a particular set of services is not allowed. In some embodiments, the notification message can indicate that a particular set of services offered by a particular APN is not allowed. The notification messages can also, in some embodiments, provide for indicating that access is not allowed through a non-cellular, untrusted, WLAN, and/or Wi-Fi connection. In some embodiments, the notification messages can indicate an alternative connection may be available, e.g., through a cellular, trusted, or other specific form of connection other than the UE 102 used to seek to establish a connection and/or access particular services that are not allowed.

IKEv2 Messages

IKEv2 messages can be exchanged between IKEv2 peers (e.g., the UE 102 and the ePDG 212) as part of one or more exchanges performed during and/or after establishment of a secure tunnel. The messages can be formatted in accordance with formats as defined in Sections of RFC 5996 and/or IETF RFC 7296. For untrusted WLAN access, the UE 102 can be notified of connection failures in IKEv2 messages provided by the ePDG 212 to the UE 102, as described in 3GPP TS 24.302, based on one or more of the following: (1) no additional PDN connection request of a particular APN can be accepted for the UE 102 (using a PDN_CONNECTION_REJECTION IKEv2 Private Notify Message with Error Type #8192); (2) no additional PDN connection request for any APN can be accepted for the UE 102 (using a MAX_CONNECTION_REACHED IKEv2 Private Notify Message with Error Type #8193); (3) access to the EPC via WLAN (non-3GPP access) is not allowed for the UE 102 (using a NON_3GPP_ACCESS_NOT_ALLOWED IKEv2 Private Notify Message that corresponds to a DIAMETER_ERROR_USER_NO_NON_3GPP_SUBSCRIPTION error code provided by one or more network elements, such as an AAA server); (4) access to a particular APN is not allowed for the UE 102 (using a NO_APN_SUBSCRIPTION IKEv2 Private Notify Message that corresponds to a DIAMETER_ERROR_USER_NO_APN_SUBSCRIPTION error code provided by one or more network elements, such as an AAA server); (5) a requested procedure cannot be successfully completed due to a (non-specific) network failure (using a NETWORK_FAILURE IKEv2 Private Notify Message that corresponds to a DIAMETER_UNABLE_TO_COMPLY error code provided by one or more network elements, such as an AAA server).

While additional failure scenarios (other than those listed above) and further Diameter error codes specified in TS 29.273 sent from one or more network elements, such as an AAA server, to the ePDG 212 are currently mapped into a common IKEv2 error code, namely AUTHENTICATION_FAILED IKEv2 Notify Message with Error Type #24. Such an IKEv2 error code provides insufficient information to the UE 102 to determine a reason for why the authentication/authorization for access to particular service (or set of services) and/or to establish a connection with a particular APN (or set of APNs) failed. As described herein, further IKEv2 extensions provide for a more fine-grained mapping of Diameter error messages to IKEv2 error codes that can assist the UE 102 (and/or the ePDG 212 to cause the UE 102) to handle the failure appropriately, such as in a network signaling efficient and/or power efficient manner. Additionally, IKEv2 extensions can provide for selective blocking of access to the EPC via WLAN, untrusted WLAN, or any particular RAT (or combination of RATs) for the UE 102 attempting to gain access to a service (or set of services) and/or to connect to one or more APNs via the EPC. In some embodiments, the IKEv2 extensions can provide for selective blocking of access to services and/or APNs when the UE 102 operates at a particular geographic location.

Figure 3:
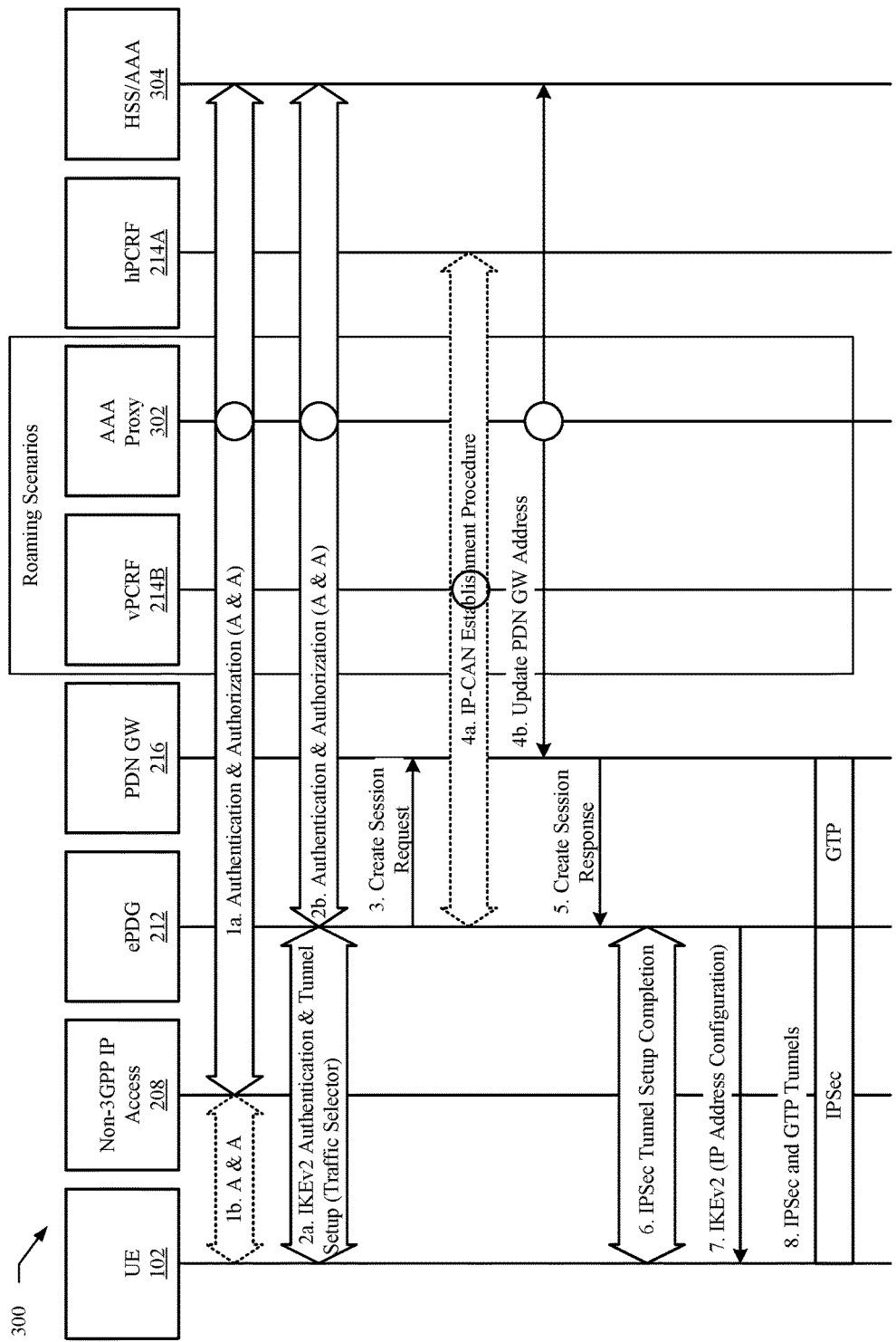
FIG. 3 illustrates a sequence diagram for an example message exchange to establish a secure tunnel between a wireless communication device and a network element, in accordance with some embodiments.
Figure 4:
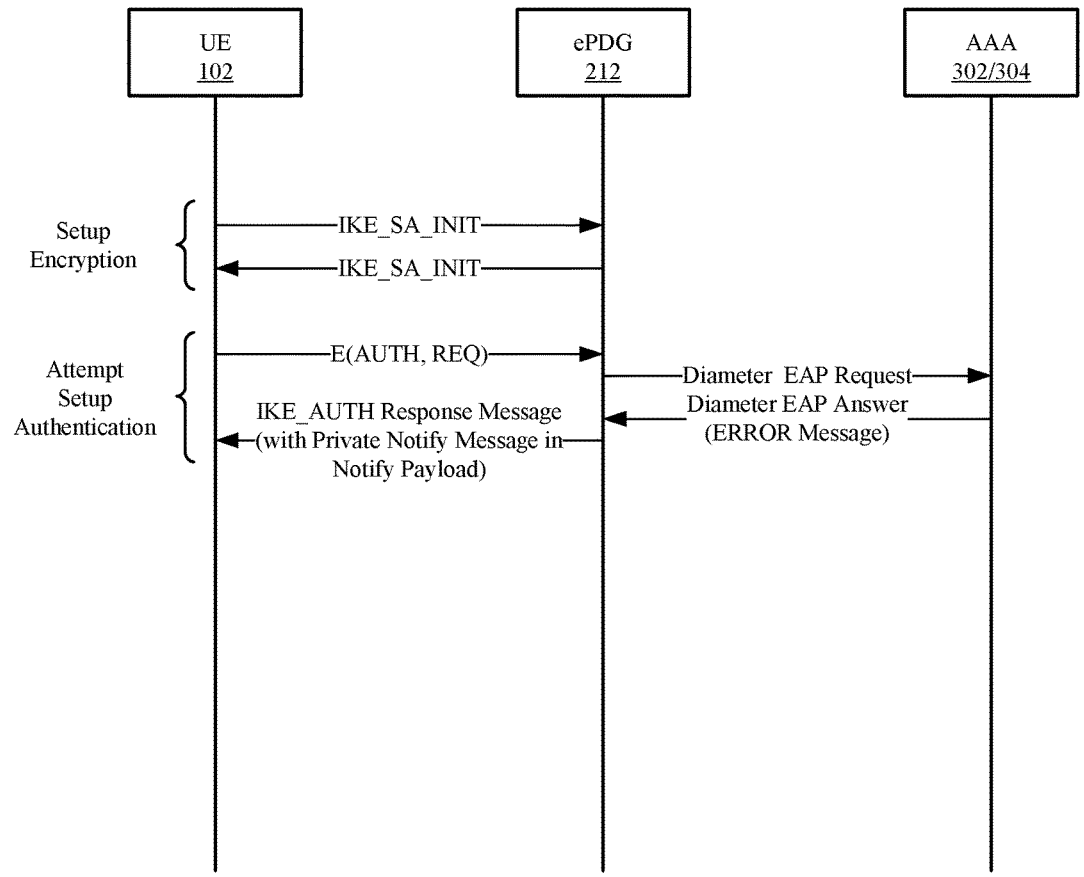
FIG. 4 illustrates a sequence diagram for a portion of an exemplary encryption and authentication message exchange when attempting to establish a connection or access a service, in accordance with some embodiments.

FIG. 3 illustrates a message exchange sequence 300 to establish a non-3GPP IP access 208 (e.g., WLAN access), in accordance with some embodiments. The UE 102 can perform a non-3GPP IP access attachment, e.g., a WLAN attachment, and can request to establish a PDN connection using an access point name (APN). In step 1a, the UE 102 can discover the non-3GPP IP access 208 and can perform an authentication and authorization (A & A) procedure with the 3GPP EPC via the non-3GPP IP access 208, e.g., as specified in 3GPP TS 23.402, clause 7.2.1. In some embodiments, the UE 102 can also perform an A&A procedure with the non-3GPP IP access 208, as indicated by step 1b (which can occur before step 1a). In steps 2a and 2b, the UE 102 can perform an IKEv2 authentication and tunnel setup procedure via the non-3GPP IP access 208 with the ePDG 212 and with the 3GPP AAA server and home subscription server (HSS/AAA) 404, e.g., as specified in 3GPP TS 33.402. For IP address preservation, the UE 102 can include its own IP address (e.g., an IPv4 address or an IPv6 prefix/address or both), which may have been allocated during a preceding attachment procedure to connect the UE 102 to the 3GPP cellular access 206, in a CFG_REQUEST message sent to the ePDG 212 during an IKEv2 message exchange. In step 3, the ePDG 212 can send a "Create Session Request" message to the PDN gateway 216. In step 4a, the PDN gateway 216 initiates an IP-CAN Session Establishment procedure with the "home" PCRF (hPCRF) 214A, or with a "visited" PCRF (vPCRF 214B) for some roaming scenarios. (As indicated in FIG. 4, in some embodiments, the UE 102 can be connected via 3GPP cellular access 206 for a "home" wireless network, in which case the "home" PCRF (hPCRF) 214A can participate in the procedures described. As also indicated in FIG. 4, the UE 102 can be connected via 3GPP cellular access 206 for a "visited" wireless network in a roaming scenario, in which case both the "visited" PCRF (vPCRF) 214B and the "home" PCRF (hPCRF) 214A can participate in the procedures described, and the communication is via an AAA proxy 402.) In step 4b, the HSS/AAA 304 is provided identify of the PDN gateway 216. In step 5, the PDN gateway 216 can send a "Create Session Response" message to the ePDG 212. In step 6, the ePDG 212 can indicate to the UE 102 that the authentication and authorization procedure with the external AAA server (e.g., HSS/AAA 404) is successful. In step 7, the ePDG 212 can send an IKE_AUTH response message to the UE 102 including an IP Address Configuration. In step 8, IP connectivity between the UE 102 and the PDN gateway 216 can be completed.

FIG. 4 illustrates, in accordance with some embodiments, a flow chart 400 of a set of message exchanges between the UE 102 and the ePDG 212, which can be part of one or both steps 1b and 2a of FIG. 3, as well as message exchanges between the ePDG 212 and one or more network elements, such as AAA server 304 (for a home network) and/or AAA proxy server 302 (for roaming scenarios in a visited network), which can be part of one or more steps 1a and 2b of FIG. 3. To establish an IPSec tunnel, for secure communication between the UE 102 and the ePDG 212, an initial exchange of IKE_SA_INIT request/response messages can be used to setup encryption followed by a second exchange of encrypted messages to setup authentication between the UE 102 and the ePDG 212. The ePDG 212 is not authenticated with the UE 102 until a final message E(AUTH, CONFIG) is provided by the ePDG 212 at the end of the authentication setup stage (completion of which is not shown in FIG. 4 as an authorization/authentication failure is indicated.

As described in 3GPP TS 29.273, which is incorporated by reference herein in its entirety for all purposes, Diameter error codes can be provided in Diameter EAP answers sent from the AAA server(s) 302/304 to the ePDG 212 in response to a diameter EAP request sent to the AAA server(s) 302/304 to establish a connection to an APN and/or to provide access to a service for the UE 102. Representative Diameter error codes can include those discussed hereinabove, as well as the following:

DIAMETER_ERROR_USER_UNKNOWN;
DIAMETER_ERROR_ROAMING_NOT_ALLOWED;
DIAMETER_ERROR_RAT_TYPE_NOT_ALLOWED.

The Diameter error codes listed above can result from failures that are persistent for a period of time; and thus repeated attempts by the UE 102 to retry will likely fail. Successful authorization/authentication can be expected when a subscription for the UE 102 and/or a user thereof changes, which can be infrequent. In some embodiments, the UE 102 can start a back-off timer and repeat the request to establish a connection to an APN (or a set of APNs) and/or to access a service (or a set of services) up to a maximum retry threshold number of times, which can be pre-configured in the UE 102, can be loaded into the UE 102 during manufacture and/or service activation, can be downloaded by a network element to the UE 102, and/or can be provided in conjunction with error messages sent to the UE 102. In some embodiments, the UE 102 is pre-configured with a back-off timer value and/or a number of retry attempts value. In some embodiments, the ePDG 212 provides to the UE 102 a back-off timer value and/or a number of retry attempts value. In some embodiments, the ePDG 212 can disallow access to particular services and/or establishment of connections to particular APNs when the UE 102 requests access via an untrusted WLAN (e.g., via non-3GPP IP access 208) from a particular location at which the service and/or connection is not allowed by a service provider. Repeated attempts by the UE 102 to gain access to the disallowed service and/or to establish a connection to the disallowed APN can repeatedly fail until the UE 102 changes location, attempts access through a different access network (or different access network type), and/or selects another service provider's network, e.g., a different PLMN.

In some embodiments, the ePDG 212 provides to the UE 102, in response to receipt of a DIAMETER_ERROR_USER_UNKNOWN error code from the AAA server(s) 302/304, a USER_UNKNOWN IKEv2 Private Notify Message (with a particular assigned Error Type number). The ePDG 212 can reject a PDN connection request from the UE 102 in response to receipt of the DIAMETER_ERROR_USER_UNKNOWN error code message from the AAA server(s) 302/304, e.g., as specified in 3GPP TS 29.273. The ePDG 212 can provide a Notify Payload in an IKE_AUTH response containing the Private Notify Message Type USER_ UNKNOWN sent to the UE 102 to indicate failure of the connection establishment and/or access to services. The UE 102 can conclude that the EPC (core network) is not accessible and can suppress authentication/authorization retry attempts to connect to the EPC of the PLMN from any ePDG 212 via the PLMN or via any other PLMN to the EPC until any combination of the following occurs: (1) the UE 102 is powered down and subsequently power up; (2) the security credentials change (or appear to change), such as when a USIM is removed and/or replaced or when an a different eSIM of an eUICC is activated; or (3) when a back-off timer expires (when such back-off timer is implemented by the UE 102) up to a maximum number of retry attempts for an identical request (e.g., same APN, same service, same connection request, etc.). In some embodiments, the maximum number of retry attempts and/or the length of a time period for the back-off timer can be specified by the UE 102 and/or by the ePDG 212 and/or by another network element and communicated to the UE 102.

In some embodiments, the ePDG 212 provides to the UE 102, in response to receipt of a DIAMETER_ROAMING_NOT_ALLOWED error code from the AAA server(s) 302/304, a ROAMING_NOT_ALLOWED IKEv2 Private Notify Message (with a particular assigned Error Type number). The ePDG 212 can reject a PDN connection request from the UE 102 in response to receipt of the DIAMETER_ROAMING_NOT_ALLOWED error code message from the AAA server(s) 302/304, e.g., as specified in 3GPP TS 29.273. The ePDG 212 can provide a Notify Payload in an IKE_AUTH response containing the Private Notify Message Type ROAMING_NOT_ALLOWED sent to the UE 102 to indicate failure of the connection establishment and/or access to services. The UE 102 can conclude that the EPC (core network) is not accessible from the PLMN and can suppress authentication/authorization retry attempts to connect to the EPC via the PLMN from any ePDG 212 of the PLMN until any combination of the following occurs: (1) the UE 102 is powered down and subsequently power up; (2) the security credentials change (or appear to change), such as when a USIM is removed and/or replaced or when an a different eSIM of an eUICC is activated; or (3) when a back-off timer expires (when such back-off timer is implemented by the UE 102) up to a maximum number of retry attempts for an identical request (e.g., same APN, same service, same connection request, etc.). In some embodiments, the maximum number of retry attempts and/or the length of a time period for the back-off timer can be specified by the UE 102 and/or by the ePDG 212 and/or by another network element and communicated to the UE 102.

In some embodiments, the ePDG 212 provides to the UE 102, in response to receipt of a DIAMETER_RAT_TYPE_NOT_ALLOWED error code from the AAA server(s) 302/304, a RAT_TYPE_NOT_ALLOWED IKEv2 Private Notify Message (with a particular assigned Error Type number). The ePDG 212 can reject a PDN connection request from the UE 102 in response to receipt of the DIAMETER_RAT_TYPE_NOT_ALLOWED error code message from the AAA server(s) 302/304, e.g., as specified in 3GPP TS 29.273. The ePDG 212 can provide a Notify Payload in an IKE_AUTH response containing the Private Notify Message RAT_TYPE_NOT_ALLOWED sent to the UE 102 to indicate failure of the connection establishment and/or access to services. The UE 102 can conclude that one or more APNs are not accessible from the PLMN using a particular RAT type, such as when attempting via a non-3GPP IP access 208 (e.g., via an untrusted WLAN access), and can suppress authentication/authorization retry attempts to connect to the EPC via the PLMN from any ePDG 212 of the PLMN using the particular disallowed RAT type access until any combination of the following occurs: (1) the UE 102 is powered down and subsequently power up; (2) the security credentials change (or appear to change), such as when a USIM is removed and/or replaced or when an a different eSIM of an eUICC is activated; or (3) when a back-off timer expires (when such back-off timer is implemented by the UE 102) up to a maximum number of retry attempts for an identical request (e.g., same APN, same service, same connection request, etc.). In some embodiments, the maximum number of retry attempts and/or the length of a time period for the back-off timer can be specified by the UE 102 and/or by the ePDG 212 and/or by another network element and communicated to the UE 102.

In some embodiments, a service provider may seek to disallow certain RAT types, such as WLAN access or untrusted WLAN access, for access to certain APNs and/or to certain services. In some embodiments, the UE 102 can attempt to migrate an established IPSec tunnel from a particular allowed RAT type, such as via a 3GPP cellular access 206, to another RAT type that is not allowed, such as to a non-3GPP IP access 208. The UE 102 can attempt to establish a new connection via the second RAT type for handover and subsequently can be denied access to handover the connection. In some embodiments, the UE 102 can attempt to add a second (or additional) connection to an existing connection, where the additional connection is through a different (and possibly disallowed RAT type). In some embodiments, the service provider can disallow the additional connection and/or migration of a connection and/or handover of a connection to a particular set of disallowed RAT types. In some embodiments, the service provider can restrict access via one or more RAT types based on a location of the UE 102. Thus, when the UE 102 changes location, such as to a different tracking area and/or different location area, the UE 102 can re-attempt to establish a connection at the new location where access may be allowed (even though disallowed at the previous location).

In some embodiments, the ePDG 212 provides to the UE 102, in response to determining that access to a service requested by the UE 102 is not allowed for the UE 102 at a location at which the UE 102 operates, a SERVICE_NOT_ALLOWED_IN_THIS_LOCATION IKEv2 Private Notify Message (with a particular assigned Error Type number). The ePDG 212 can identify that a connection attempt to access one or more particular services by the UE 102 is not allowed by a service provider at the location where the UE 102 operates. In some embodiments, the ePDG 212 indicates that a particular service, a particular PLMN, a particular service provider, a particular location (or geographic area), or any combination of these is not allowed for the UE 102. The ePDG 212 can provide a Notify Payload in an IKE_AUTH response containing the Private Notify Message Type SERVICE_NOT_ALLOWED_IN_THIS_LOCATION sent to the UE 102 to indicate failure of the connection establishment and/or access to services at the location at which the UE 102 operates. The UE 102 can conclude that the EPC (core network) is not accessible from the location and/or from a currently selected PLMN using a particular RAT type, such as via an untrusted WLAN, and can suppress authentication/authorization retry attempts to connect to the EPC of the PLMN from any ePDG 212 via the PLMN until any combination of the following occurs: (1) the UE 102 is powered down and subsequently power up; (2) the security credentials change (or appear to change), such as when a USIM is removed and/or replaced or when an a different eSIM of an eUICC is activated; (3) a different PLMN is selected; (4) when the UE 102 changes location (such as to a different tracking area and/or a different location area) by a pre-configured distance measure; or (5) when a back-off timer expires (when such back-off timer is implemented by the UE 102) up to a maximum number of retry attempts for an identical request (e.g., same APN, same service, same connection request, etc.). In some embodiments, the maximum number of retry attempts and/or the length of a time period for the back-off timer can be specified by the UE 102 and/or by the ePDG 212 and/or by another network element and communicated to the UE 102.

Figure 5:
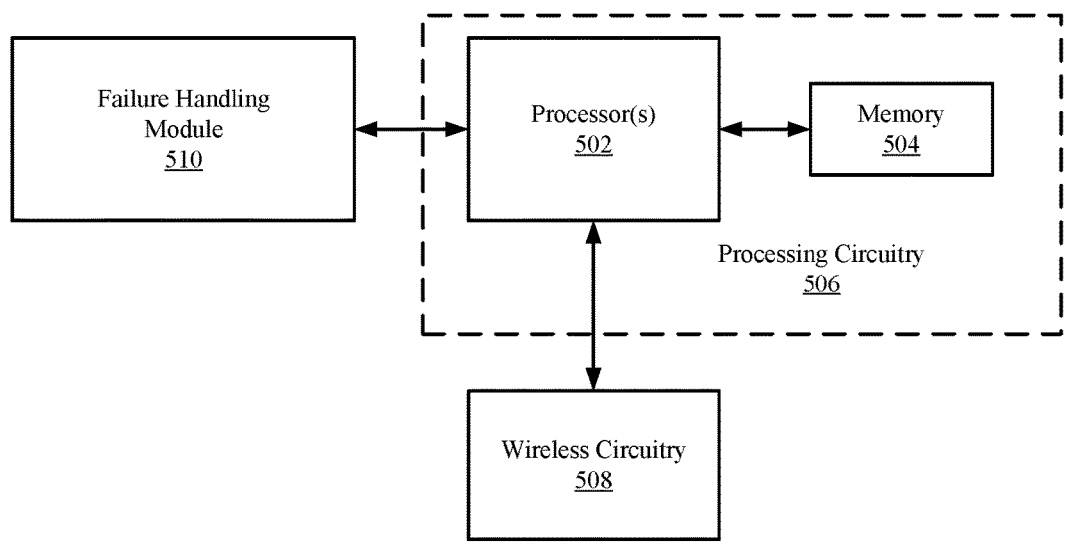
FIG. 5 illustrates a block diagram of a representative apparatus that can be implemented on a wireless communication device to support authentication failure handling, in accordance with some embodiments.

FIG. 5 illustrates, in accordance with some embodiments, a diagram 500 of components of a wireless communication device, such as UE 102, including one or more processor(s) 502 coupled to memory 504, which together can be referred to as processing circuitry 506, wireless circuitry 508 that provides for wireless radio frequency (RF) connections between the UE 102 and various wireless networks, e.g., the 3GPP cellular access 206 using the cellular wireless circuitry 104A and/or the non-3GPP IP access 208 using the non-cellular wireless circuitry 104B. The UE 102 can also include a failure handling module 510 configurable to operate together with the processing circuitry 506 and the wireless circuitry 508 to perform one or more operations for the UE 102 as described herein to manage access control to services and/or networks under various authentication and/or authorization failure scenarios. In some embodiments, the wireless circuitry 508 includes one or more baseband processor(s), and a set of RF analog front-end circuitry. In some embodiments, the wireless circuitry 508 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 508 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless networks.

The processor(s) 502 and the wireless circuitry 508 can be configured to perform and/or control performance of one or more functionalities of the UE 102, in accordance with various implementations. The processor(s) 502 and the wireless circuitry 508 can provide functionality for attempting connections and/or requesting service access to one or more access point names (APNs) and/or services provided through one or more APNs for the UE 102. The processor(s) 502 may include multiple processors of different types that can provide for both wireless communication management and/or higher layer functions, e.g., one or more of the processor(s) 502 may be configured to perform data processing, application execution, and/or other device functions according to one or more embodiments of the disclosure. The UE 102, or portions or components thereof, such as processor(s) 502, can include one or more chipsets, which can respectively include any number of coupled microchips thereon.

In some embodiments, the processor(s) 502 may be configured in a variety of different forms. For example, the processor(s) 502 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 502 of the UE 102 can be coupled to and/or configured in operative communication with each other, and these components may be collectively configured to perform IP flow mobility management functions via multiple wireless networks. In some implementations, the processor(s) 502 can be configured to execute instructions that may be stored in memory 504, or that can otherwise be accessible to the processor(s) 502 in some other device memory. As such, whether configured as, or in conjunction with, hardware or a combination of hardware and software, the processor(s) 502 may be capable of performing operations according to various implementations described herein, when configured accordingly. In various embodiments, memory 504 in the UE 102 may include multiple memory devices that can be associated with any common volatile or non-volatile memory type. In some scenarios, the memory 504 may be associated with a non-transitory computer-readable storage medium that can store various computer program instructions, which may be executed by the processor(s) 502 during normal program executions. In this regard, the memory 504 can be configured to store information, data, applications, instructions, or the like, for enabling the UE 102 to carry out various functions in accordance with one or more embodiments of the disclosure. In some implementations, the memory 504 may be in communication with, and/or otherwise coupled to, the processor(s) 502, as well as one or more system buses for passing information between and amongst the different device components of the UE 102.

It should be appreciated that not all of the components, device elements, and hardware illustrated in and described with respect to the UE 102 shown in FIG. 5 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 5.

Figure 6:
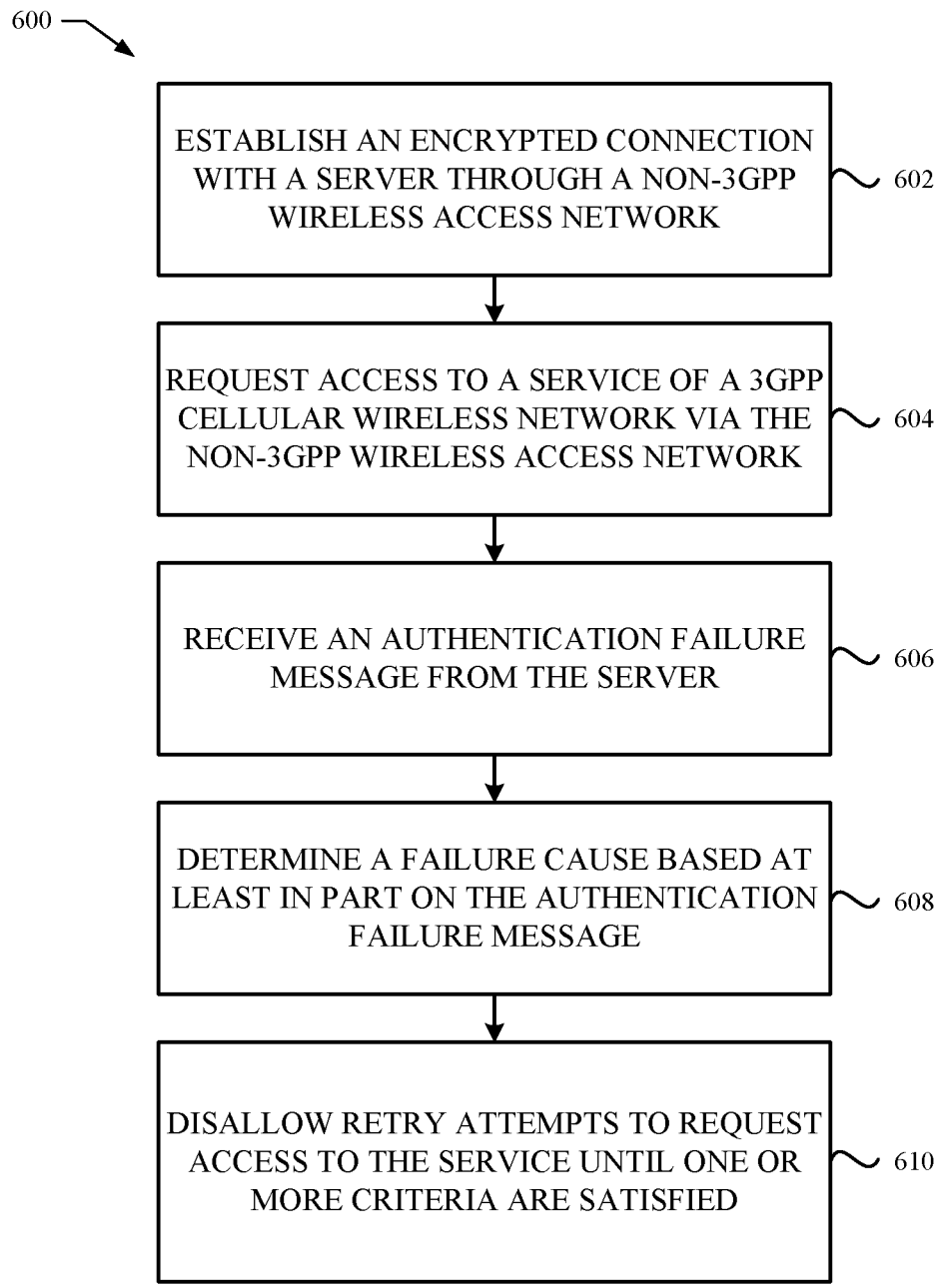
FIG. 6 illustrates an example method to control access to services for a wireless communication device, in accordance with some embodiments.

FIG. 6 illustrates a flowchart 600 of an example method to control service access for a wireless communication device implemented at the wireless device, at least in part, in accordance with some embodiments. In step 602, the wireless communication device (such as UE 102) establishes an encrypted connection with a server (such as ePDG 212) through a non-3GPP wireless access network (such as via non-3GPP IP access 208 and/or via an untrusted WLAN). In step 604, the wireless communication device requests access to a service of a 3GPP cellular wireless network via the non-3GPP wireless access network. In step 606, the wireless communication device receives an authentication failure message from the server. In step 608, the wireless communication device determines a failure cause based at least in part on the authentication failure message. In step 610, the wireless communication device disallows retry attempts to request access to the service until one or more criteria are satisfied.

Figure 7:
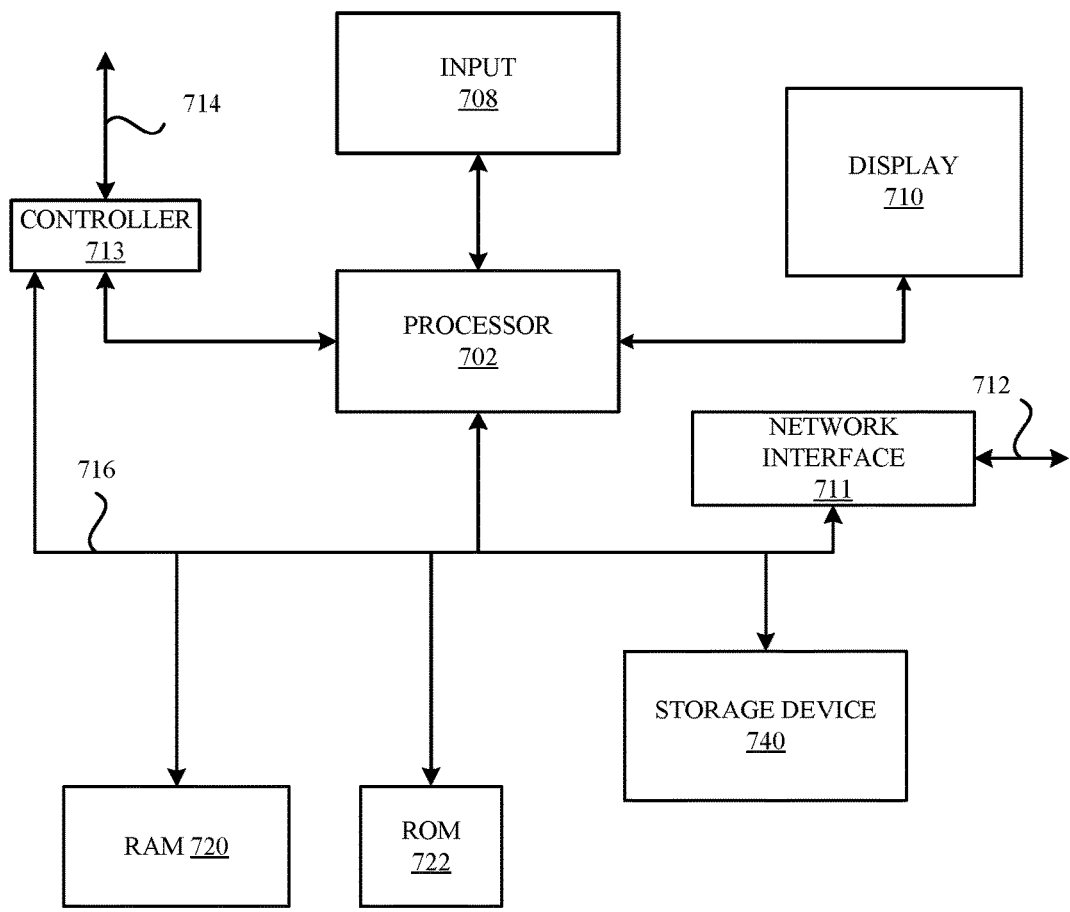
FIG. 7 illustrates in block diagram format an example representative set of elements of a wireless communication device that can be used to implement the various components and techniques described herein, in accordance with some embodiments.

FIG. 7 illustrates a block diagram 700 of an example representative set of elements of a wireless communication device that can be used to implement the various components and techniques described herein. In particular, the detailed view of the exemplary wireless communication device illustrates various components that can be included in the wireless device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user (for example, visual/silent alert notifications and/or information relating to incoming, outgoing, or active communication sessions). A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor.

The computing device 700 also includes a storage device 740, which can comprise a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of the computing device 700.

Representative Embodiments

In an embodiment, a method to control service access for a wireless communication device includes the wireless communication device: (i) establishing an encrypted connection with a server through a non-3GPP wireless access network; (ii) requesting access to a service of a 3GPP cellular wireless network via the non-3GPP wireless access network; (iii) receiving an authentication failure message from the server; (iv) determining a failure cause based at least in part on the authentication failure message; and (v) disallowing retry attempts to request access to the service until one or more criteria are satisfied.

In some embodiments, the wireless communication device requests access to the service of the 3GPP cellular wireless network by at least attempting to establish a secure tunnel to an access point name (APN). In some embodiments, the authentication failure message from the server indicates to the wireless communication device that the wireless communication device is not allowed access to the APN. In some embodiments, the authentication failure message from the server indicates to the wireless communication device that the wireless communication device is not allowed access to the service of the 3GPP cellular wireless network. In some embodiments, the authentication failure message from the server indicates to the wireless communication device that the wireless communication device is not allowed access to the APN or to the service of the 3GPP cellular wireless network via the non-3GPP wireless access network. In some embodiments, the authentication failure message includes an Internet Key Exchange Version 2 (IKEv2) message indicating the service is not available to the wireless communication device for the geographic location at which the wireless communication device is operating. In some embodiments, the one or more criteria are satisfied based at least in part on a network-specified back-off time period following each retry attempt. In some embodiments, the one or more criteria are satisfied based at least in part on a network-specified back-off time period following each retry attempt. In some embodiments, the one or more criteria are satisfied based at least in part on the wireless communication device changing its geographic location by a pre-configured measure. In some embodiments, the one or more criteria are satisfied based on the wireless communication device requesting access to the service via a different non-3GPP wireless access network.

In an embodiment, a wireless communication device includes one or more antennas; wireless circuitry communicatively coupled to the one or more antennas and to processing circuitry, and the processing circuitry including one or more processors and a storage medium storing instructions that, when executed on the one or more processors, cause the wireless communication device to: (i) establish an encrypted connection with a server through a non-3GPP wireless access network; (ii) request access to a service of a 3GPP cellular wireless network via the non-3GPP wireless access network; (iii) receive an authentication failure message from the server; (iv) determine a failure cause based at least in part on the authentication failure message; and (v) disallow retry attempts to request access to the service until one or more criteria are satisfied.

In some embodiments, the wireless communication device requests access to the service of the 3GPP cellular wireless network by at least attempting to establish a secure tunnel to an access point name (APN). In some embodiments, the authentication failure message from the server indicates to the wireless communication device that the wireless communication device is not allowed access to the APN. In some embodiments, the authentication failure message from the server indicates to the wireless communication device that the wireless communication device is not allowed access to the service of the 3GPP cellular wireless network. In some embodiments, the authentication failure message from the server indicates to the wireless communication device that the wireless communication device is not allowed access to the APN or to the service of the 3GPP cellular wireless network via the non-3GPP wireless access network. In some embodiments, the authentication failure message includes an Internet Key Exchange Version 2 (IKEv2) message indicating the service is not available to the wireless communication device for the geographic location at which the wireless communication device is operating. In some embodiments, the one or more criteria are satisfied based at least in part on a network-specified back-off time period following each retry attempt. In some embodiments, the one or more criteria are satisfied based at least in part on changes to security credentials of a Subscriber Identity Module (SIM) for the wireless communication device. In some embodiments, the one or more criteria are satisfied based at least in part on the wireless communication device changing its geographic location by a pre-configured measure.

In an embodiment, an apparatus configurable for operation in a wireless communication device includes processing circuitry including a processor and a memory storing instructions that, when executed by the processor, cause the wireless communication device to: (i) establish an encrypted connection with a server through a non-3GPP wireless access network; (ii) request access to a service of a 3GPP cellular wireless network via the non-3GPP wireless access network; (iii) receive an authentication failure message from the server; (iv) determine a failure cause based at least in part on the authentication failure message; and disallow retry attempts to request access to the service until one or more criteria are satisfied.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to control service access for a wireless communication device, the method comprising:
by the wireless communication device:
establishing an encrypted connection with an evolved packet data gateway (ePDG) server through a non-third generation partnership project (non-3GPP) wireless access network;
requesting access to a particular service of a third generation partnership project (3GPP) cellular wireless network via the ePDG server and the non-3GPP wireless access network;
receiving an authentication failure message from the ePDG server, the authentication failure message comprising a specific error indication mapped by the ePDG server based on an error code received from an authentication server of the 3GPP cellular wireless network;
determining a failure cause based at least in part on the specific error indication of the authentication failure message; and
disallowing retry attempts to request access to the particular service until one or more criteria are satisfied.

2. The method of claim 1, wherein the wireless communication device requests access to the particular service of the 3GPP cellular wireless network by at least attempting to establish a secure tunnel to an access point name (APN).

3. The method of claim 2, wherein the authentication failure message from the ePDG server indicates to the wireless communication device that the wireless communication device is not allowed access to the APN.

4. The method of claim 2, wherein the authentication failure message from the ePDG server indicates to the wireless communication device that the wireless communication device is not allowed access to the particular service of the 3GPP cellular wireless network.

5. The method of claim 2, wherein the authentication failure message from the ePDG server indicates to the wireless communication device that the wireless communication device is not allowed access to the APN or to the particular service of the 3GPP cellular wireless network via the non-3GPP wireless access network.

6. The method of claim 1, wherein the authentication failure message comprises an Internet Key Exchange Version 2 (IKEv2) message indicating the particular service is not available to the wireless communication device for a geographic location at which the wireless communication device is operating.

7. The method of claim 1, wherein the one or more criteria are satisfied based at least in part on a network-specified back-off time period following each retry attempt.

8. The method of claim 1, wherein the one or more criteria are satisfied based at least in part on changes to security credentials of a Subscriber Identity Module (SIM) for the wireless communication device.

9. The method of claim 1, wherein the one or more criteria are satisfied based at least in part on the wireless communication device changing its geographic location by a preconfigured measure.

10. The method of claim 1, wherein the one or more criteria are satisfied based on the wireless communication device requesting access to the particular service via a different non-3GPP wireless access network.

11. A wireless communication device comprising:
one or more antennas,
wireless circuitry communicatively coupled to the one or more antennas and to processing circuitry; and
the processing circuitry comprising one or more processors and a storage medium storing instructions that, when executed on the one or more processors, cause the wireless communication device to:
establish an encrypted connection with an evolved packet data gateway (ePDG) server through a non-third generation partnership project (non-3GPP) wireless access network;
request access to a particular service of a third generation partnership project (3GPP) cellular wireless network via the ePDG server and the non-3GPP wireless access network;
receive an authentication failure message from the ePDG server, the authentication failure message comprising a specific indication mapped by the ePDG server based on an error code received from an authentication server of the 3GPP cellular wireless network;
determine a failure cause based at least in part on the specific error indication of the authentication failure message; and
disallow retry attempts to request access to the particular service until one or more criteria are satisfied.

12. The wireless communication device of claim 11, wherein the wireless communication device requests access to the particular service of the 3GPP cellular wireless network by at least attempting to establish a secure tunnel to an access point name (APN).

13. The wireless communication device of claim 12, wherein the authentication failure message from the ePDG server indicates to the wireless communication device that the wireless communication device is not allowed access to the APN.

14. The wireless communication device of claim 12, wherein the authentication failure message from the ePDG server indicates to the wireless communication device that the wireless communication device is not allowed access to the particular service of the 3GPP cellular wireless network.

15. The wireless communication device of claim 12, wherein the authentication failure message from the ePDG server indicates to the wireless communication device that the wireless communication device is not allowed access to the APN or to the particular service of the 3GPP cellular wireless network via the non-3GPP wireless access network.

16. The wireless communication device of claim 11, wherein the authentication failure message comprises an Internet Key Exchange Version 2 (IKEv2) message indicating the particular service is not available to the wireless communication device for a geographic location at which the wireless communication device is operating.

17. The wireless communication device of claim 11, wherein the one or more criteria are satisfied based at least in part on a network-specified back-off time period following each retry attempt.

18. The wireless communication device of claim 11, wherein the one or more criteria are satisfied based at least in part on changes to security credentials of a Subscriber Identity Module (SIM) for the wireless communication device.

19. The wireless communication device of claim 11, wherein the one or more criteria are satisfied based at least in part on the wireless communication device changing its geographic location by a pre-configured measure.

20. An apparatus configurable for operation in a wireless communication device, the apparatus comprising:
processing circuitry including a processor and a memory storing instructions that, when executed by the processor, cause the wireless communication device to:
establish an encrypted connection with an evolved packet data gateway (ePDG) server through a non-third generation partnership project (non-3GPP) wireless access network;
request access to a particular service of a third generation partnership project (3GPP) cellular wireless network via the ePDG server and the non-3GPP wireless access network;
receive an authentication failure message from the ePDG server, the authentication failure message comprising a specific error indication mapped by the ePDG server based on an error code received from an authentication server of the 3GPP cellular wireless network;
determine a failure cause based at least in part on the specific error indication of the authentication failure message; and
disallow retry attempts to request access to the particular service until one or more criteria are satisfied.

* * * * *